United States Patent [19]

Kawai

[11] Patent Number: 4,667,297
[45] Date of Patent: May 19, 1987

[54] RUNNING SPEED DETECTOR

[75] Inventor: Joji Kawai, Akashi, Japan

[73] Assignee: Mitsubishi Denki Kabushiki Kaisha, Tokyo, Japan

[21] Appl. No.: 683,583

[22] Filed: Dec. 19, 1984

[30] Foreign Application Priority Data

Dec. 20, 1983 [JP] Japan .................. 58-242643

[51] Int. Cl.$^4$ .................. G01P 3/42; G01P 3/48; G06F 15/20; G06G 7/00
[52] U.S. Cl. .................. 364/565; 364/426; 324/160; 324/166
[58] Field of Search ........... 364/565, 426, 569; 324/166, 160

[56] References Cited

U.S. PATENT DOCUMENTS

| 3,922,534 | 11/1975 | Gerstenmeier et al. | 364/565 |
| 4,050,747 | 9/1977 | Ruhnau et al. | 369/565 |
| 4,179,656 | 12/1979 | Wagner | 364/565 |
| 4,184,203 | 1/1980 | Skawada | 364/565 |
| 4,199,719 | 4/1980 | Grob | 324/166 |
| 4,229,695 | 10/1980 | Bassi | 324/166 |
| 4,270,176 | 5/1981 | Skawada | 364/565 |
| 4,323,976 | 5/1982 | Radaelli et al. | 364/565 |
| 4,337,511 | 6/1982 | Schneider et al. | 364/565 |
| 4,420,814 | 12/1983 | Arekawa et al. | 364/565 |
| 4,434,470 | 2/1984 | Thomas et al. | 364/565 |
| 4,468,617 | 8/1984 | Ringwall | 324/160 |
| 4,485,452 | 11/1984 | Cording et al. | 364/565 |
| 4,506,312 | 3/1985 | Chan et al. | 364/565 |
| 4,527,248 | 7/1985 | Takase et al. | 364/565 |

Primary Examiner—Felix D. Gruber
Assistant Examiner—Danielle B. Laibowitz
Attorney, Agent, or Firm—Leydig, Voit & Mayer

[57] ABSTRACT

The present invention relates to a running speed detector comprising:

a pulse encoder which generates pulses of a frequency proportional to the running speed of a rotary member;

pulse period counting device for counting the periods of pulses having said frequency relying upon clock signals;

memory for storing ounted values of periods counted by said pulse period counting means; and and a calculating device which receives pulses having said frequency, which calculates the sum of n latest counted values that have been counted already after the arrival of each of said pulses or after the arrival of a predetermined number of pulses, and which calculates the running speed that varies in proportion to a ratio of the number n of counted values of periods to said sum of counted values of periods.

2 Claims, 10 Drawing Figures

RUNNING SPEED DETECTOR

BACKGROUND OF THE INVENTION

The present invention relates to a running speed detector of the digital type which detects the running speed by counting pulses having a frequency which is directly proportional to the running speed of a rotary member.

FIG. 1 shows a conventional running speed detector of this type. In FIG. 1, a pulse train 1 is produced by a pulse encoder (or shaft encoder) attached to the rotary shaft of a rotary member, and has a frequency which is proportional to the number of revolutions of the rotary member. Reference numeral 2 denotes a counter N which counts the number of pulses of the pulse train, numeral 3 denotes a register which stores the counted value n, i.e., the number of pulses counted by the counter N, numeral 4 denotes a counter T which counts the number of clock signals c of a predetermined frequency inputted thereto, numeral 5 denotes a register which stores the counted value Tn, i.e., which stores the number of clock signals counted by the counter 4, numeral 6 denotes a timing pulse generator which sends reset signals RS to the counters N and T, and which also sends latch signals RA to the registers 3 and 5. Reference numeral 7 denotes an arithmetic unit such as a microprocessor which reads the counted values n and Tn in the registers 3 and 5, respectively, in order to calculate a running speed V of the rotary member.

The operation of the running speed detector will be described herebelow with reference to FIG. 2, in which (a) denotes a pulse train 1, symbols $P_1$, $P_2$, ..., $P_n$ denote pulse numbers, and (b) denotes the change in the number of pulses n as a function of time.

The counters N and T initiate the counting operation from a time $t_O$ at which the pulse train 1 and a clock signal c are brought into synchronism with each other. The synchronization is effected by the reset signal RS. As the counted value of the counter T reaches $T_c$ at the time, $t_c$ the timing pulse generator 6 generates a reset signal RS and a latch signal RA at a time $t_n$ at which the period of a pulse pn in the pulse train 1 finishes. Responsive to the latch signal RA, the register 3 stores the counted value n counted by the counter N, and the register 5 stores the counted value Tn (sampling period) counted by the counter T from the time $t_0$ to the time $t_n$. At the same time, the counters N and T initiate the counting operation again responsive to the reset signal RS. Relying upon the counted values n and $T_n$, the arithmetic unit 7 calculates $$V = K \cdot n / Tn \quad (1)$$

to detect the running speed of the rotary member.

Here, Tc is a factor which induces error in the measurement. When a maximum allowance is denoted by $\alpha$, therefore, Tc must be so set as to satisfy a relation $\alpha > 1/Tc$.

According to the above-mentioned conventional speed detecting method, therefore, it is not possible to decrease the sampling period Tn to be smaller than Tc. Namely, the running speed of the rotary member can only be detected after n pulses in the pulse train have been counted. In controlling the running speed of, for example, the motor, therefore, the speed of control response is limited by Tc.

SUMMARY OF THE INVENTION

The present invention was accomplished in order to preclude the above-mentioned defect of the conventional art, and is concerned with a running speed detector according to which a period of a pulses is counted upon the arrival of every pulse in the pulse train, the sum of a predetermined number n of periods which have been counted and stored most recently is calculated, in order to calculate a running speed which is proportional to a ratio of the sum to the counted periods of pulses, so that the running speed can be learned upon arrival of every pulse to greatly reduce the period of detection.

BRIEF DESCRIPTION OF THE DRAWINGS

In the drawings, the same reference numerals or symbols denote the same or corresponding portions.

DESCRIPTION OF THE PREFERRED EMBODIMENTS

An embodiment of the invention will be described below in conjunction with FIG. 3.

Figure 1:
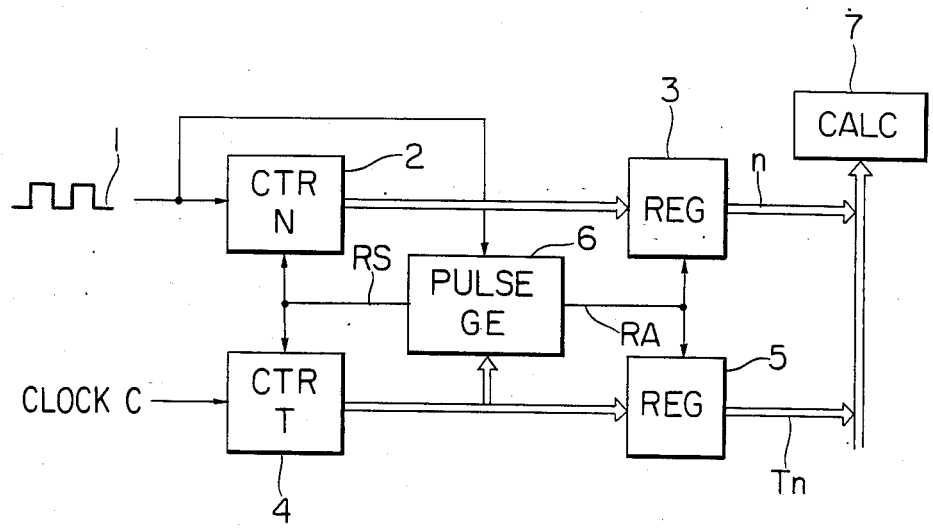
FIG. 1 is a block diagram of a conventional running speed detector.
Figure 2:
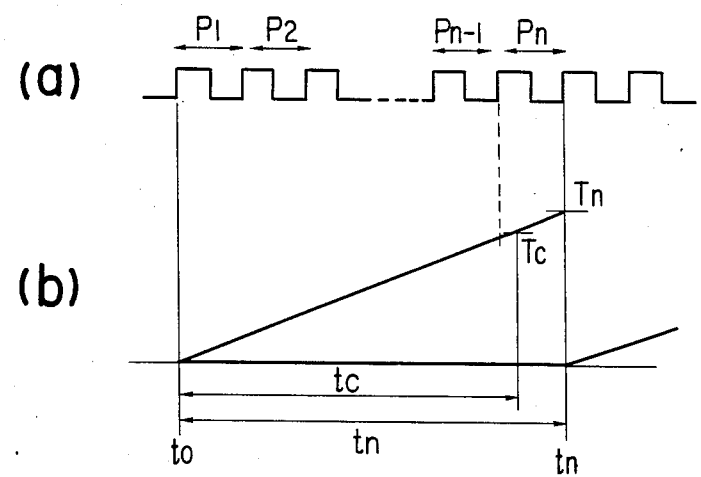
FIGS. 2a and 2b are time charts for illustrating the operation of the conventional running speed detector.
Figure 3:
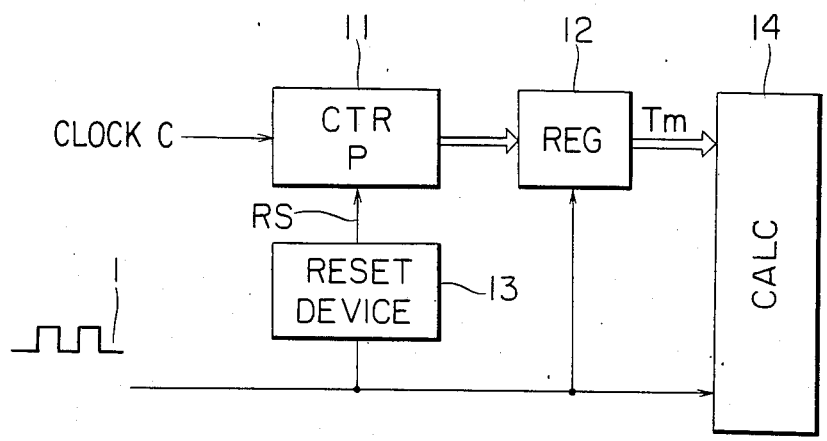
FIG. 3 is a block diagram which illustrates an embodiment of the present invention.

In FIG. 3, reference numeral 11 denotes a counter P for counting the number of clock pulses c inputted thereto, numeral 12 denotes a register which stores the counted value (counted value of periods) counted by the counter P upon receipt of every pulse in the pulse train 1, numeral 13 denotes a reset device which sends a reset signal RS to the counter P upon arrival of every pulse in the pulse train 1, and reference numeral 14 denotes an arithmetic unit which receives the pulse train 1, and which reads the counted value of periods from the register 12 upon arrival of every pulse to calculate the running speed V.

Figure 4:
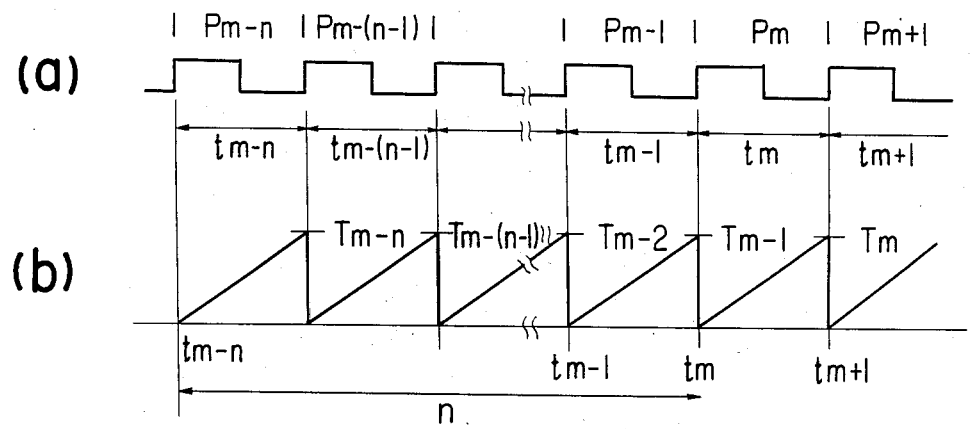
FIGS. 4a and 4b are time charts for illustrating the operation of the embodiment of the present invention.

The operation of the device of the embodiment will be described here below with reference to FIG. 4.

The counter P counts the number of clock pulses c and is reset upon receipt of every pulse in the pulse train 1. Therefore, a finally counted value just before receipt of reset signal RS, is stored in the register 12. That is, when the period of a pulse Pm in the pulse train 1 is finished and a next pulse Pm +1 arrives at the input of a reset device 13, the counted value Tm of clock pulses c counted by the counter P up to that moment is stored in the register 12. The counted value Tm is proportional to the period of the pulse Pm. The arithmetic unit 14 reads the counted value Tm of periods from the register 12 and stores the counted values upon receipt of every respective pulse in the pulse train 1, and calculates the sum ΣnT of the latest n counted values inclusive of the most recently counted value $T_{m-1}$ $$\Sigma nt = T_{m-1} + T_{m-2} + \ldots T_{m-n} \quad (2)$$

and calculates the running speed $$V = K \cdot n / \Sigma nT \quad (3)$$

The value n is so selected that the sum $\Sigma nT$ will assume a minimal value but exceeding Tc. The value n can be selected by:

(a) A method by which the number of counted values of periods is increased until the sum $\Sigma nT$ exceeds Tc; or (b) A method by which the most recently counted value of periods (of the moment of $t_{m-1}$) is added to a sum $\Sigma kT$ of the past k counted values of periods of up to $t_{m-2}$, and l counted values of clock signals are subtracted from the added value starting from the oldest ones to such a degree that the sum will not become smaller than Tc. Then, from the thus obtained value $\Sigma nT$, $n = k + 1 - l$ is obtained.

According to the selection method (a), the number of counted values of periods to be added increases with the increase in the running speed V, and the time for executing the calculation is lengthened.

According to the selection method (b), on the other hand, the number of counted values of periods to be newly added is one, and the number of counted values to be subtracted is one under steady running condition, and is one or zero under the acceleration condition, and is n or less under the deceleration condition. Therefore, the time for executing the operation can be shortened.

A memory capacity of the arithmetic unit 14, i.e., a maximum number $n_{max}$ of counted values of periods to be stored, is found from a relation $n_{max} = Tc/Tmin$, where Tmin represents the number of counted values at the time of a maximum running speed.

Figure 5:
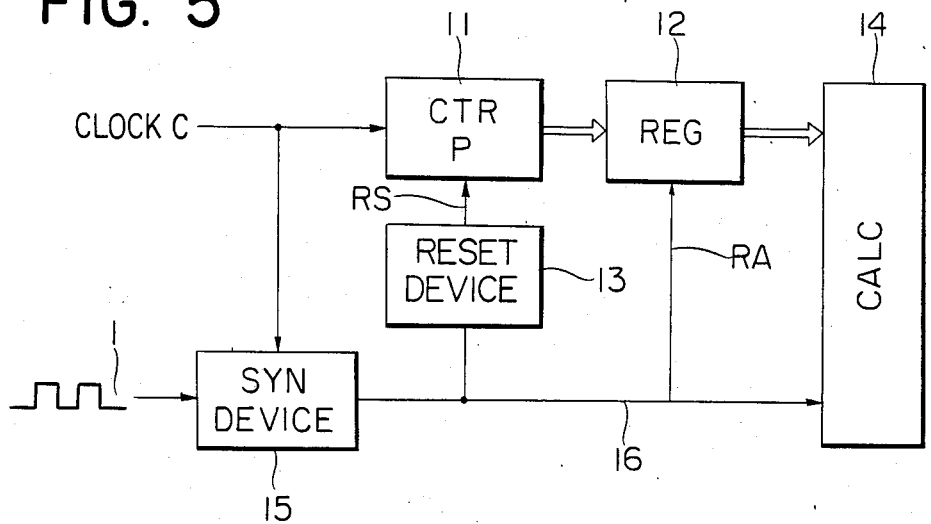
FIG. 5 is a block diagram illustrating another embodiment according to the present invention.

In the above-mentioned embodiment, the pulse train 1 is not in synchronism with the clock signals c. Therefore, error develops in the integrated counted value to a maximum of $+n$ clock signals. To prevent the occurrence of an error, a synchronizing device 15 should be provided as shown in FIG. 5 to bring the arriving pulse train 1 into synchronism with the clock signals c, such that the counter P is reset with the synchronized pulse train 16, and that the data is read from the register by the arithmetic unit 14 in synchronism therewith.

In the above-mentioned embodiment, furthermore, the running speed V is calculated after the arrival of every pulse in the pulse train 1. As the running speed increases, however, the period of pulse train 1 becomes so short that it becomes difficult to perform the calculation after the arrival of every pulse. In such a case, the calculation should be performed after every predetermined number of pulses.

Figure 6:
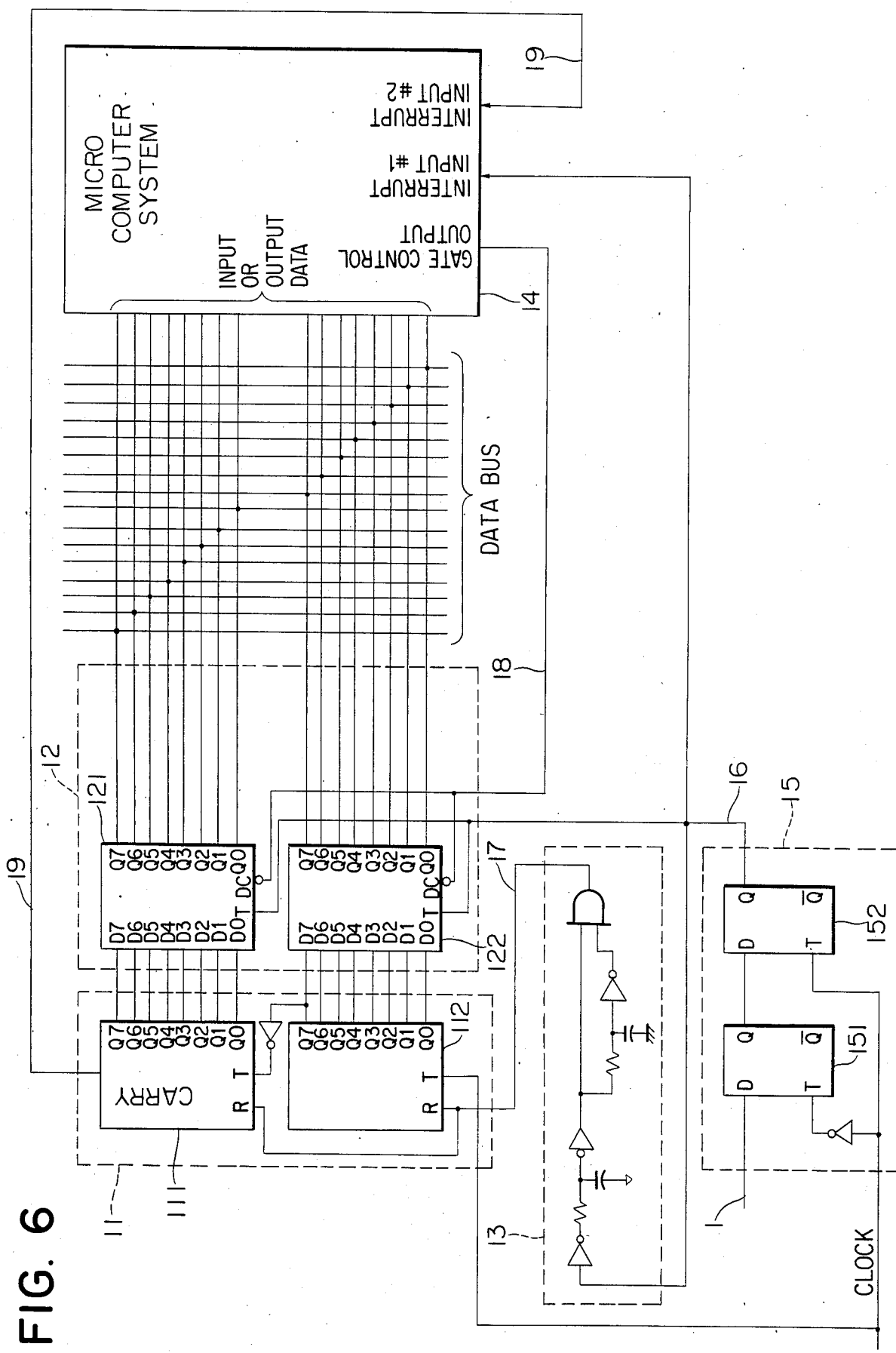
FIG. 6 is a circuit diagram which illustrates a running speed detector.

Referring to the FIG. 6 which shows an example of a 16-bit running speed detector, counter 11 is composed of a binary 16-bit counter comprising two 8 bit binary counters IC 111 and 112.

This counter 11 counts the number of clock pulses during every period from the time a reset pulse 17 is issued to the time a next reset pulse is issued. When the counted valve overflows, the counter 11 outputs a carry signal 19 to an arithmetic unit 14.

A register 12 is composed of two octal D-type edge-triggered flip-flop 121, 122 with 3-state outputs such as an IC of SN 74LS374 made by TEXAS INSTRUMENTS INC. The register 12 holds the output data of the counter 11 synchronously with the rising edge of a pulse 16. The register 12 outputs the held data through a data bus to the arithmetic unit 14 in accordance with a read-out command from the arithmetic unit 14.

A synchronizer 15 is composed of two D-type flip-flops 151 and 152.

The flip-flop 151 of an initial stage is triggered by the timing of the fall of the clock, and triggered by the rise of the clock. As a result, a pulse train 1 is converted to a signal 16 synchronized by the rise of the clock. The purpose of using two flip-flops of different triggering points is to exclude the abnormal signal which might be generated when the pulse train 1 and the clock accidentally coincide in time.

A reset circuit 13 is composed of a delay circuit and a short pulse generator. The reset circuit 13 supplies a short pulse for resetting the counter 11 immediately after the output data of the counter 11 is held in the register 12 by the synchronizing signal 16.

Figure 7:
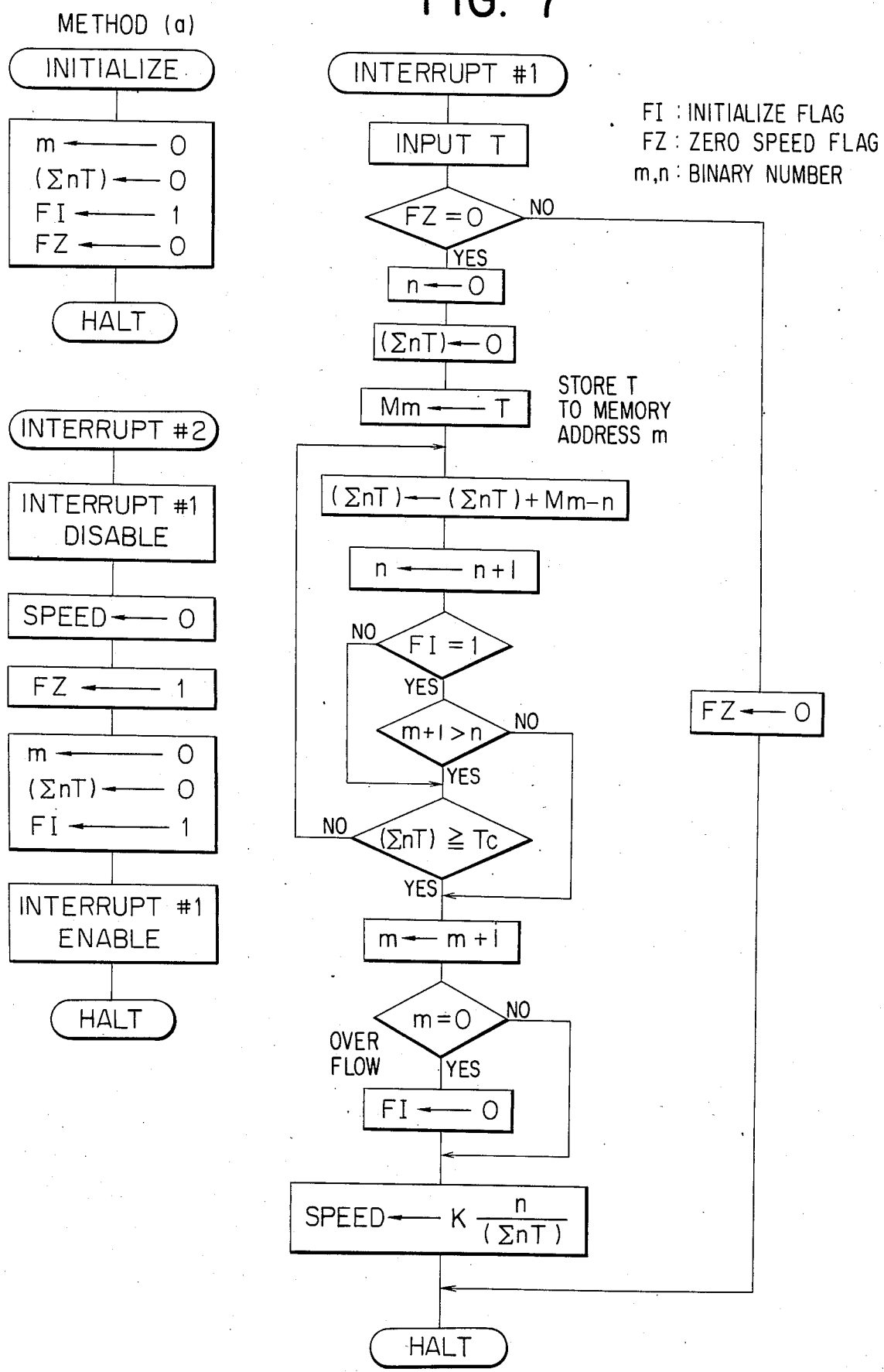
FIGS. 7 and 8 are flow charts for illustrating the operation of the arithmetic units.
Figure 8:
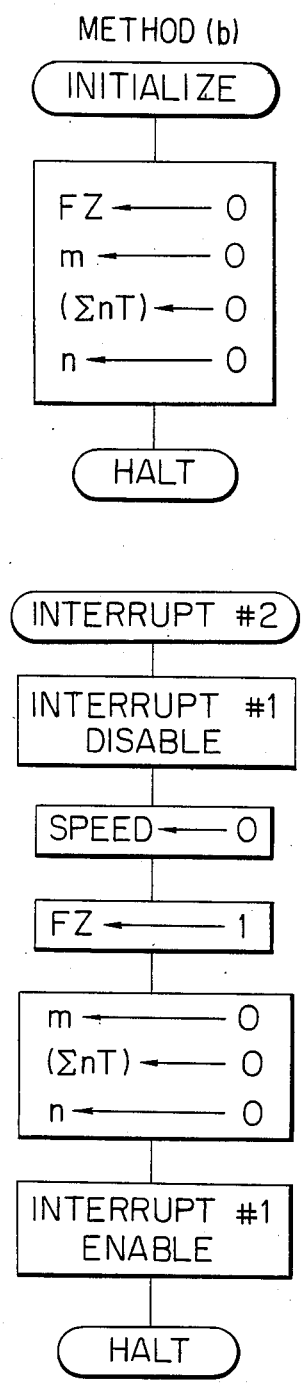

Arithmetic unit 14 is a microcomputer system, which includes a microcomputer, a ROM, a RAM, an interrupt control circuit, and input/output control circuit. Here, a data bus, two interrupt inputs #1, #2 and a control output are used. The arithmetic unit 14 executes the calculation in accordance with a program stored in the ROM contained therein. In other words, when a synchronizing pulse 16 is applied to the interrupt input #1 of the arithmetic unit 14, a gate control output 18 is outputted to the register 12. The register 12 produces 16 bit data T held therein to a data bus in accordance with a signal 18. The arithmetic unit 14 reads out the data T, and executes the calculation of the above-described equations (2) and (3) by a method of the above described (a) or (b). The interrupt input #2 notifies the arithmetic unit 14 of the fact that the counted value of the counter 11 has overflowed. When the running speed is excessively low, the periods of the pulse train 1 and the synchronized pulse 16 become very long. The counted value of the counter 11 overflows at this time. The arithmetic unit 14 recognizes the overflow by the interrupt input #2 and recognizes the speed as 0. The operations of the arithmetic unit 14 by the methods (a) and (b) are shown by flow charts in FIGS. 7 and 8.

According to the present invention as described above, the running speed is detected responsive to every pulse in the pulse train having a frequency which is proportional to the running speed. Therefore, the detecting period is reduced strikingly compared with the conventional art, response characteristics of the apparatus for controlling the speed of motors are improved greatly, and it is made possible to more precisely control the running speed of motors.

What is claimed is:

1. A running speed detector for a rotary member, the running speed detector comprising:
    a pulse encoder which generates pulses of a frequency proportional to the running speed of the rotary member;
    clock means for generating clock pulses of a predetermined frquency;
    pulse period counting means, operatively associated with the pulse encoder and the clock means, for counting the clock pulse periods during each encoder pulse period;
    memory means coupled to the pulse period counting means for storing counted values of clock pulse periods; and
    arithmetic means, operatively associated with the pulse encoder and the memory means, for calculating after a predetermined number of encoder pulse periods the sum of n latest counted values of clock pulse periods and the running speed in accordance with the ratio of the number n to said sum of counted values of clock pulse periods.

2. A running speed detector according to claim 1 further comprising means for synchronizing the encoder pulses with said clock pulses.

* * * * *